(12) United States Patent
Silfverberg et al.

(10) Patent No.: US 7,075,513 B2
(45) Date of Patent: Jul. 11, 2006

(54) ZOOMING AND PANNING CONTENT ON A DISPLAY SCREEN

(75) Inventors: Miika Silfverberg, Helsinki (FI); Panu Korhonen, Helsinki (FI); Ian Scott MacKenzie, Thornhill (CA)

(73) Assignee: Nokia Corporation, Espoo (FI)

( * ) Notice: Subject to any disclaimer, the term of this patent is extended or adjusted under 35 U.S.C. 154(b) by 561 days.

(21) Appl. No.: 09/944,165

(22) Filed: Sep. 4, 2001

(65) Prior Publication Data

US 2003/0043114 A1   Mar. 6, 2003

(51) Int. Cl.
*G09G 5/08* (2006.01)

(52) U.S. Cl. ............... 345/157; 345/158; 345/159; 345/167; 345/173

(58) Field of Classification Search ........... 345/157, 345/156, 167, 173, 684, 158–159
See application file for complete search history.

(56) References Cited

U.S. PATENT DOCUMENTS

| | | | | |
|---|---|---|---|---|
| 4,509,841 | A | * | 4/1985 | Sakai et al. .................. 396/93 |
| 5,038,164 | A | * | 8/1991 | Harada ....................... 396/121 |
| 5,278,779 | A | * | 1/1994 | Conway et al. ............ 361/680 |
| 5,530,455 | A | | 6/1996 | Gillick et al. |
| 5,542,138 | A | * | 8/1996 | Williams et al. ............. 5/658 |
| 5,543,588 | A | * | 8/1996 | Bisset et al. ............ 178/18.06 |
| 5,615,384 | A | * | 3/1997 | Allard et al. ............... 345/800 |
| 5,729,219 | A | * | 3/1998 | Armstrong et al. .......... 341/20 |
| 5,742,476 | A | | 4/1998 | Miyazaki et al. |
| 5,771,038 | A | * | 6/1998 | Wang ......................... 345/163 |
| 5,825,349 | A | | 10/1998 | Meier et al. |
| 5,943,052 | A | | 8/1999 | Allen et al. |
| 5,949,408 | A | | 9/1999 | Kang et al. |
| 5,952,994 | A | * | 9/1999 | Ong et al. .................. 345/668 |
| 5,999,169 | A | | 12/1999 | Lee |
| 6,025,832 | A | | 2/2000 | Sudo et al. |
| 6,031,518 | A | | 2/2000 | Adams et al. |
| 6,104,334 | A | | 8/2000 | Allport |
| 6,107,988 | A | * | 8/2000 | Phillipps ..................... 345/156 |
| 6,184,864 | B1 | | 2/2001 | Chao |
| 6,201,947 | B1 | | 3/2001 | Hur et al. |
| 6,204,880 | B1 | * | 3/2001 | Nishimura ............ 348/240.99 |
| 6,211,856 | B1 | * | 4/2001 | Choi et al. .................. 345/666 |

(Continued)

FOREIGN PATENT DOCUMENTS

EP    0 880 090 A2    11/1998

(Continued)

OTHER PUBLICATIONS

Bederson, Ben, et al., "Implementing a Zooming User Interface: Experience Building Pad++", Retrieved from Internet Jun. 12, 2001, University of Maryland, Computer Science Department, College Park, MD.

(Continued)

*Primary Examiner*—Bipin Shalwala
*Assistant Examiner*—Leonid Shapiro
(74) *Attorney, Agent, or Firm*—Banner & Witcoff, Ltd.

(57) ABSTRACT

A method and system for manipulating content displayed on a display screen is disclosed. A data processing device has two attached user input controls, such as touch pads, joysticks, and the like. One of the controls may be used for panning (i.e. scrolling up and down and/or left and right) content on the display screen, while the other control may simultaneously be used for zooming in and zooming out of content as it is displayed on the display screen. The zoom and pan increment levels may be smooth or stepped, depending on a user preference, to aid in navigation of the content displayed on the display screen.

23 Claims, 5 Drawing Sheets

U.S. PATENT DOCUMENTS

| | | | |
|---|---|---|---|
| 6,229,502 B1 | 5/2001 | Schwab | |
| 6,323,883 B1 | 11/2001 | Minoura et al. | |
| 6,359,615 B1 | 3/2002 | Singh | |
| 6,407,749 B1 | 6/2002 | Duke | |
| 6,424,464 B1* | 7/2002 | Neff et al. | 359/451 |
| 6,473,796 B1* | 10/2002 | Tanaka | 709/224 |
| 6,484,011 B1 | 11/2002 | Thompson et al. | |
| 6,512,511 B1* | 1/2003 | Willner et al. | 345/169 |
| 6,570,583 B1* | 5/2003 | Kung et al. | 345/661 |
| 6,760,013 B1* | 7/2004 | Willner et al. | 345/169 |
| 2001/0023499 A1* | 9/2001 | Wakahara | 725/143 |
| 2002/0140680 A1* | 10/2002 | Lu | 345/169 |

FOREIGN PATENT DOCUMENTS

| | | |
|---|---|---|
| EP | 0 880 091 A2 | 11/1998 |
| EP | 0 880 090 A3 | 11/2000 |
| WO | WO 99/32960 | 7/1999 |
| WO | WO 99/54807 | 10/1999 |

OTHER PUBLICATIONS

Bederson, Ben, et al., "Pad++: A Zoomable Graphical Sketchpad For Exploring Alternate Interface Physics", Computer Science Department, University of New Mexico, Albuquerque, NM, Sep. 19, 1995.

Bederson, Ben, et al., "A Zooming Web Browser", Retrieved from Internet Jun. 12, 2001, Computer Science Department, University of New Mexico, Albuquerque, NM.

Meyer, Jonathan, "A Brief Tour Through Pad++", http://www.cs.umd.edu/hcil/pad++/tour/index.htm, Apr. 1997, Retrieved from Internet Jun. 12, 2001.

Stewart, Jason, et al., "When Two Hands Are Better Than One: Enhancing Collaboration Using Single Display Groupware", Computer Science Department, University of New Mexico, Albuquerque, NM, ACM SIGCHI 1998.

"Learn More; What is Jazz?", wysiwyg://69/http://www.cs.umd.edu/hcil/jazz/learn/index.shtm, Retrieved from Internet Jun. 12, 2001, Computer Science Department, University of Maryland, College Park, MD.

"Pad ++—Frequently Asked Questions", http://www.cs.umd.edu/hci/pad++/faq.htm, Retrieved from Internet Jun. 12, 2001, Computer Science Department, University of Maryland, College Park, MD.

\* cited by examiner

ZOOMING AND PANNING CONTENT ON A DISPLAY SCREEN

FIELD OF THE INVENTION

The invention relates to data processing devices. More specifically, the invention relates to a method and system for manipulating documents on data processing devices using panning and zooming controls.

BACKGROUND OF THE INVENTION

Handheld devices are increasingly being used to manipulate larger and larger data files. For instance, Internet web pages, maps, word processing documents, spreadsheets, and the like are being used more frequently on handheld devices and other devices whose displays are smaller than a conventional desktop monitor. The smaller display size of these devices makes user interaction cumbersome and slow because the user is required to perform lots of scrolling in order to view the complete document; i.e. only a portion of the entire document may be viewed on the smaller display screen at any given time. Additionally, users are more likely to get disoriented within the document because they may forget which subsection of the entire document they are currently viewing.

Similar problems exist on conventional desktop and laptop computers (PCs), although not to the same degree as with handheld devices because the display screen size is typically larger on conventional computers. Several known solutions exist for the above-described problems with respect to conventional desktop and laptop computers. One such solution is the use of scrollbars. That is, when there is more data than can be displayed on a single display screen, scrollbars can be used to move window content up and down or left and right, or both. However, scrollbars are slow and also require precise pointing and interaction by a user. This can interrupt the natural task flow with which the user was previously engaged. In addition, the precision required to scroll on a small-screen device is often difficult to achieve due to the limited size of the display.

Another known solution for conventional PCs is to use a mouse adapted with a roller wheel or trackball, also referred to as a wheel-mouse or trackpoint-mouse. Microsoft® and IBM® mice devices allow scrolling by placing a wheel or a trackball on the mouse. These methods can be inefficient, because the same hand is used for pointing and scrolling, and zooming is not supported. In addition, a wheel-mouse may allow only vertical scrolling, depending on its configuration.

Other known solutions are application specific. That is, many applications allow various levels of zoom control. However, zooming typically takes place in steps, such that there are regular zoom levels. The applications do not smoothly zoom in and out of a document. When these applications zoom in, especially when a big zoom "step" is taken, the user often gets lost because it is difficult to judge where in the document the zooming took place. Zoom stepping is typically performed using a combo-box or complex set of keystrokes (e.g. ctrl +, ctrl −), which also breaks the user's natural task flow.

A known smooth zooming application is Pad++, available on the Internet at the web site http://hci.ucsd.edu/pad++/. However, Pad++ software only allows a user to use one hand for both zooming and panning because it ties zooming and panning operations to a computer mouse. This makes it complex and difficult to master, much less to perform both at the same time. One hand is overloaded with complex functions, while the other hand remains idle.

Thus, it would be an advancement in the art to develop a method and device to overcome the above-described problems in manipulating documents and data files that are larger than the size of a display on a data processing device.

BRIEF SUMMARY OF THE INVENTION

In a first embodiment, a data processing device comprises a display screen, a first user input control capable of detecting a direction of user input, and a second user input control capable of detecting a direction of user input. When user input is received through the first user input control, content on the display screen is panned in a direction responsive to the detected direction of the received user input. When user input is received through the second user input control, content on the display screen is zoomed in or out responsive to the detected direction of the received user input.

In a second embodiment, there is a method for manipulating content displayed on a display screen of a data processing device. When first user input is received through a first user input control capable of detecting a direction of user input, content on a display screen is panned in a direction responsive to the detected direction of the first user input. When second user input is received through a second user input control capable of detecting a direction of user input, content on the display screen is zoomed in or out responsive to the detected direction of the second user input.

In some embodiments, the user input controls comprise touch pads. In other embodiments, the user input controls comprise joysticks. In yet other embodiments, the user input controls comprise trackballs.

In some embodiments, at least one of the controls is a roller wheel.

In some embodiments, the controls are located on a side of the device other than the side on which the display screen in located. In other embodiments, the controls are approximately located on diametrically opposite sides of the display screen.

In some embodiments, the controls are located such that, when holding the device with two hands, one on either side of the displayed screen, the user can manipulate one control with her right hand and the other control with her left hand.

DETAILED DESCRIPTION OF THE INVENTION

The invention provides a method and system for manipulating data files by embedding two controls, such as touch pads, joysticks, and the like, on the back of a handheld device. One of the controls may be used for panning (i.e. scrolling up and down and/or left and right) within a data file, while the other control may simultaneously be used for zooming in and zooming out of the data file as it is displayed on a display screen. Data files include Internet web pages, maps, word processing documents, spreadsheets, .PDF files or any other file that contains data that is interpreted and displayed on a display screen.

Figure 1:
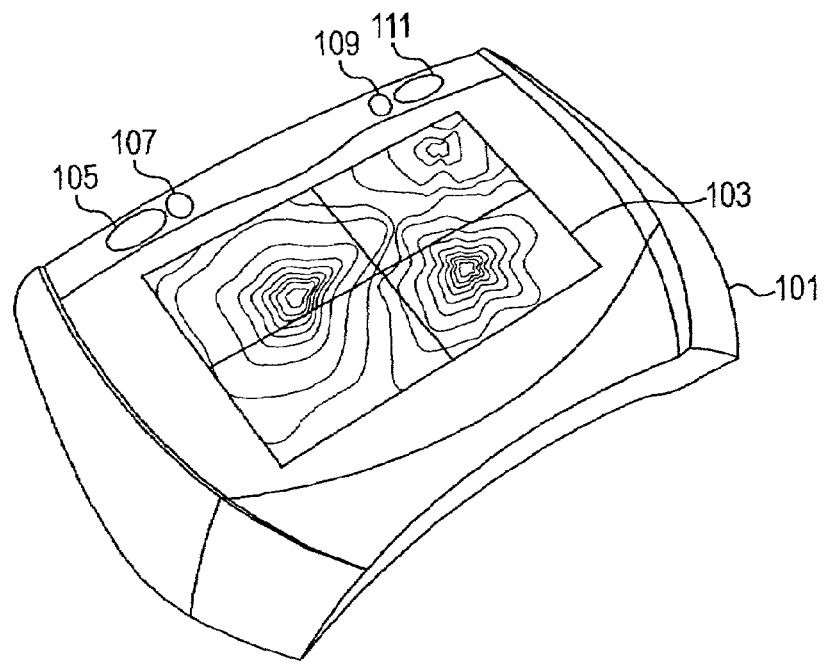
FIG. 1 illustrates a perspective view of the front of a device adapted to perform in accordance with an embodiment of the invention.

FIG. 1 shows a front view of a handheld device 101 adapted to perform according to an aspect of the invention. The device 101 may be any type of computing device including, but not limited to, a laptop computer, personal digital assistant (PDA), tablet computer, special purpose computing device, mobile telephone, or the like. The handheld device 101 comprises a display screen 103 and control buttons 105, 107, 109, and 111. The display screen 103 may be used for any purpose for which such a device generally uses a display screen.

Figure 2:
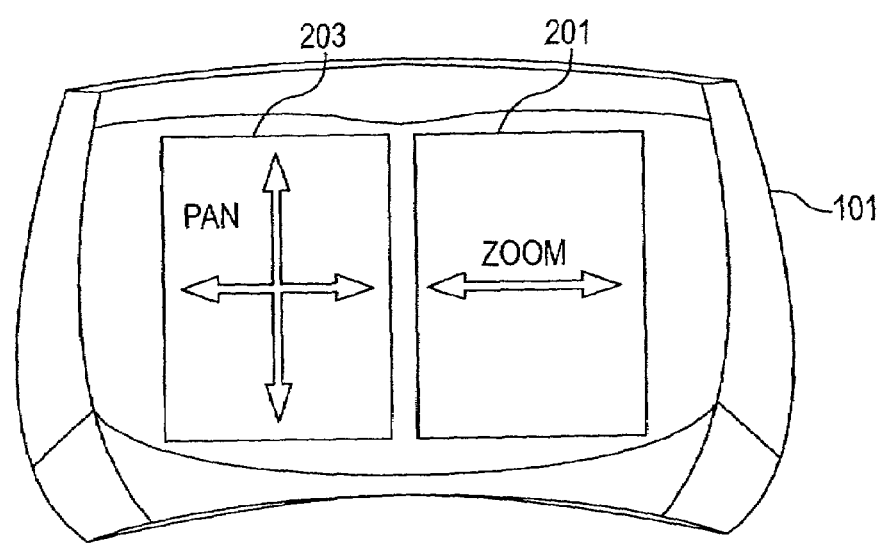
FIG. 2 illustrates a rear view of the device shown in FIG. 1.

FIG. 2 shows a back view of the handheld device 101. When the display screen 103 is being used to manipulate a data file, controls 201 and 203 may be activated. The first control 201 may be used for zooming in and out, while the second control 203 may be used for panning. Obviously, their functions may be reversed. The controls 201 and 203 may be any of various known control types, including but not limited to, touch pads, joysticks, roller wheels, trackballs, and the like, as are known in the art. Any control that may allow a user to scroll in two dimensions or zoom in and out on a display screen may be used. For purposes of illustration, the controls shown in FIG. 2 and used in examples herein are touch pads.

Control 201 may be manipulated by a user to perform zooming in and zooming out of a document that is presently displayed on the display screen 103. When the user places her finger on the zooming pad 201 and moves it around, the image on the display zooms in and out. The zooming may take place smoothly, with very little differentiation between zoom levels, or the zooming may take place in larger steps. The smooth zooming method is such in which the steps of zoom are not fixed, but the zoom-ratio may be any permanent or temporary value between maximum and minimum values. If the maximum and minimum values are temporary, several network entities such as a terminal manufacturer's server connected to the Internet or other network may define the values. The minimum and maximum values may alternatively be part of the content application. The values may also be received prior or during the content delivery. The zoom increment may also optionally be set by the user through a preferences screen, as is known in the art.

Horizontal and/or vertical input may be used to perform zooming of the display screen. This may also be a user-defined option, or it may be predetermined. Smooth zooming is known in the art, and may be performed using Pad++ software, referred to above, or using an application specific integrated circuit for zooming, such as an ASI 320/321 available from Aurora Systems, Inc., located in San Jose, Calif.

For instance, if a user moves her finger from left to right on the zoom control 201, the display may zoom in. If the user moves her finger right to left, the display may zoom out. Alternatively, the directions of input movement may be reversed with respect to the resultant zoom direction. In addition, vertical movement up and down may be used to perform zooming. If the user moves her finger in a downward motion on the control 201, the display may zoom in. If the user moves her finger in an upward motion on the control 201, the display may zoom out. This also may be reversed. Finally, it is also possible that horizontal and vertical input are used simultaneously to perform zooming. For instance, if the user moves her finger in either an upward or left to right motion on the control 201, the display may zoom in, while if the user moves her finger in a downward or right to left motion on the control 201, the display may zoom out. These directions may also be reversed.

Using the zoom pad 201, a user can zoom far out of the document to see the whole information space at once. That is, the entire data file may be viewed on the display screen 103. This helps the user to see the structure or layout of the entire document. Also, the user may zoom close in to see more intricate details of the document. Obviously, anything in-between these two extremes is also possible. Ideally, smooth zooming (i.e. very little differentiation between zoom levels) should be used. Smooth zooming helps a user to keep track of the document's structure and layout, as well as the relative position of the document on the display. Additionally, smooth zooming adds a simulated third dimension, the depth-dimension, to the user interface. In one embodiment the user interface content may be three-dimensional; i.e. objects may be placed at different "depths" in the information space. As the user zooms in on three-dimensional content, new content that was not visible (or even suggested) when zoomed out appears on the display screen as the user zooms in. Alternatively, the content may remain three-dimensional, where content merely gets larger as the user zooms in.

In embodiments where content is three-dimensional, content may be defined such that specified content may only appear when the display is in a predetermined range of zoom levels. Thus, different pieces of content may come into view and pass out of view at various zoom levels, providing a simulated three-dimensional effect.

The second pad 203 may be used for panning. As with zooming, the panning increment may be smooth or stepped, optionally determined by the user, or as described with respect to zooming, above. As a default panning may be set to be smooth. When the user moves her finger around on the panning touch pad 203, the content on the display screen moves responsive to the direction in which the user moves her finger. That is, the device may be set to move the display screen content in the same or opposite direction as the user's finger. This may be determined by the user, or preset within the device. This navigational technique provides an intuitive interface to the user, as the touch pad may be located behind the display. Thus, the user may interact with the display as if she is moving a physical object with her finger.

Often documents are longer than the height of the display screen as well as wider than the width of the display screen. In such instances panning may take place in two dimensions, both horizontal and vertical (or any combination of these). This is especially the case when the user has zoomed in on a document. In such instances, the user may pan the display horizontally and vertically. In one embodiment, the horizontal component of the user's input on the control pad 203 pans the display horizontally. Likewise, the vertical component of the user's input on the control pad 203 pans the display vertically. Obviously, if the document is only wider than the display screen but not longer, then panning may only take place horizontally. Likewise, if the document is longer than the screen but not wider, then panning may only take place vertically.

By providing controls that may be independently manipulated, the device may perform zooming and panning simultaneously in response to user input. This allows the user to more effectively control zooming operations. For instance, when zooming in on a document with one hand, the user may use the other hand for corrective "steering" of the document by panning in a direction toward the portion of the display to which the user is zooming. This is especially useful when zooming-in, where the user may otherwise easily get disoriented by zooming in on the incorrect portion of the document.

The above-described dual control system is especially suitable for handheld computing devices. By using the inventive dual control system, larger amounts of information may easily be shown on a small display screen because the user may more easily manipulate the information on the display to find that which she is looking for. Additionally, by placing the dual controls on a side of the device other than the side on which the display screen is located, the display screen may be made larger than it otherwise could because it is not competing for space on the handheld device with the dual controls.

While FIGS. 1 and 2 illustrate one embodiment of a handheld device, other embodiments are also possible. For instance, the dual controls 201 and 203 in FIGS. 1 and 2 are shown on a side of the handheld opposite that of the display screen, such that a user using her fingers may manipulate the controls 201 and 203 when gripping the device with two hands, one from each side. This configuration allows for efficient, ergonomic use of the device by the user.

Figure 3:
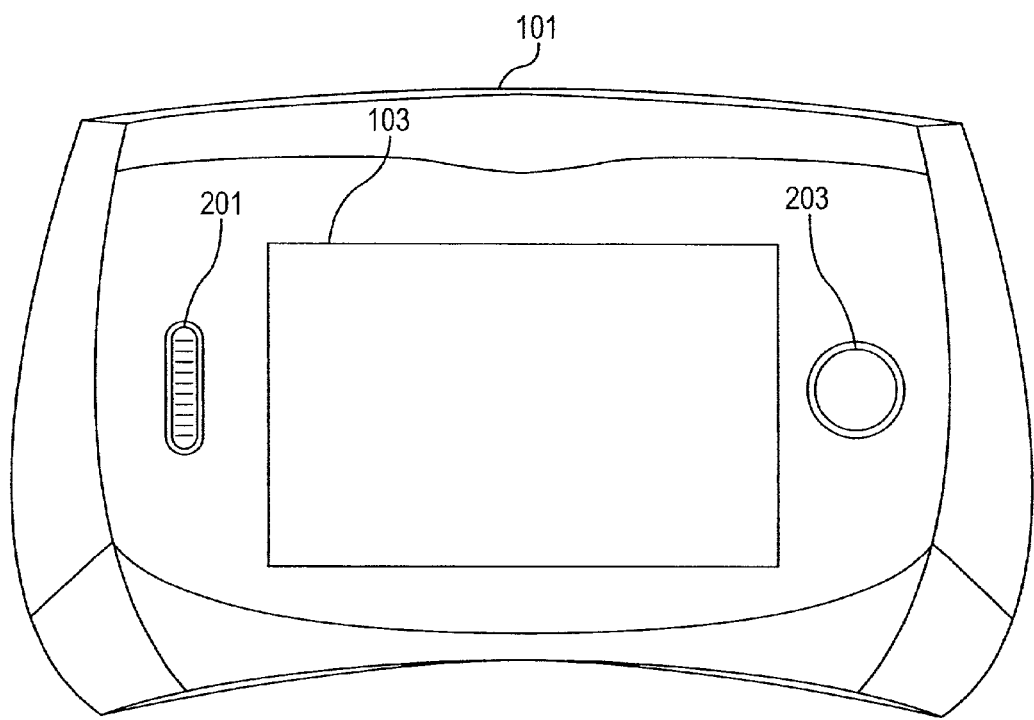
FIG. 3 illustrates a front view of a device adapted to perform in accordance with an embodiment of the invention.
Figure 4:
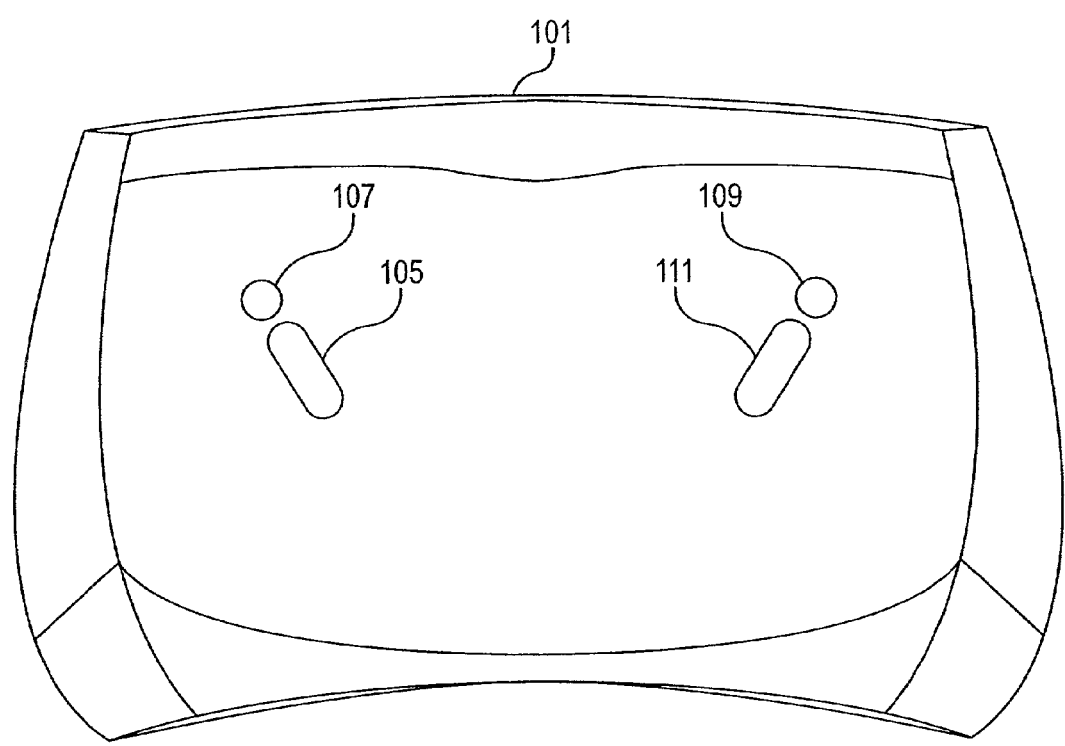
FIG. 4 illustrates a rear view of the device shown in FIG. 3.

Alternatively, as shown in FIG. 3, the controls 201 and 203 may be placed on either side of the display screen, but on the same side of the device as the display screen, such that a user may manipulate the controls 201 and 203 using her thumbs. In such an embodiment, shown in FIG. 4, control buttons 105, 107, 109, and 111, or any subset or superset thereof, may optionally be placed on the opposite side of the device or in any other suitable location, such that the user may manipulate the control buttons with her fingers when gripping the device with two hands, one on either side.

As stated above, instead of touch pads, controls 201 and 203 may comprise a roller wheel, a trackball, a joystick, a control button (such as +, − or multi stage + and − buttons) or any combination of the above alternatives, such as is shown in FIG. 3. In FIG. 3, zoom control 201 is a roller wheel, while pan control 203 is a trackball. Any other type of known user input device might alternatively be used such that it is capable of allowing a user to input scroll and/or pan commands to the device.

Figure 5:
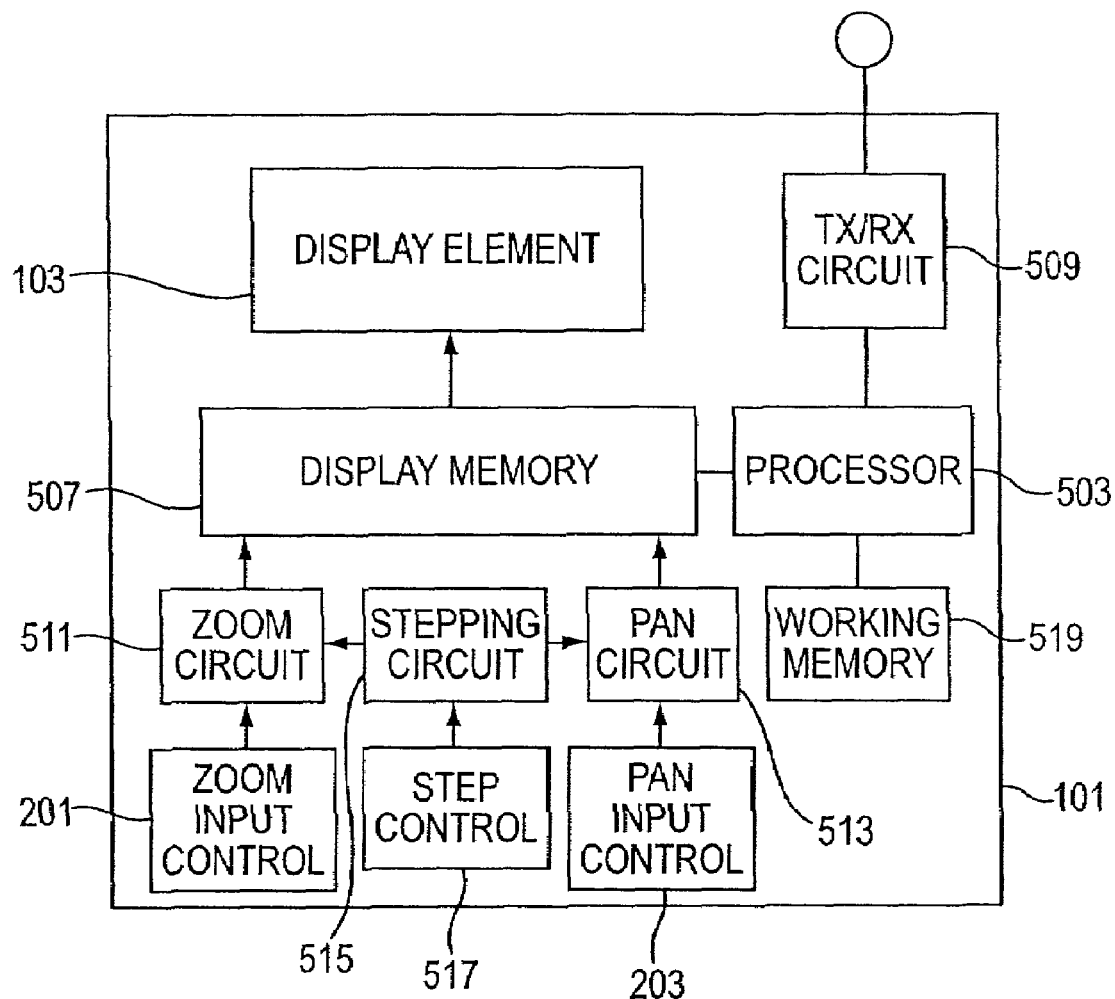
FIG. 5 is a block diagram of an embodiment of the invention.

FIG. 5 illustrates a block diagram of the device 101 according to an embodiment of the invention. The device 101 includes a processor 503, a display element 103, a display memory 507, a TX/RX circuit 509, zoom circuit 511, zoom input control 201, pan circuit 513, pan input control 203, stepping circuit 515, stepping control 517, and working memory 519. Processor 503 controls the overall operation of the device 101. TX/RX circuit 509 is used to send and receive data to and from an external data source. Display memory 507 controls the content that is displayed on the display element 103. Working memory 519 stores any software and data necessary to perform panning and zooming in accordance with the invention. The working memory 519 may comprise volatile memory, non-volatile memory, or any combination of the two. The zoom input control 201 and pan input control 203 may include any of the above-recited input controls, such as touch pads, roller wheels, trackballs, joysticks, keypad buttons, and the like.

Figure 6:
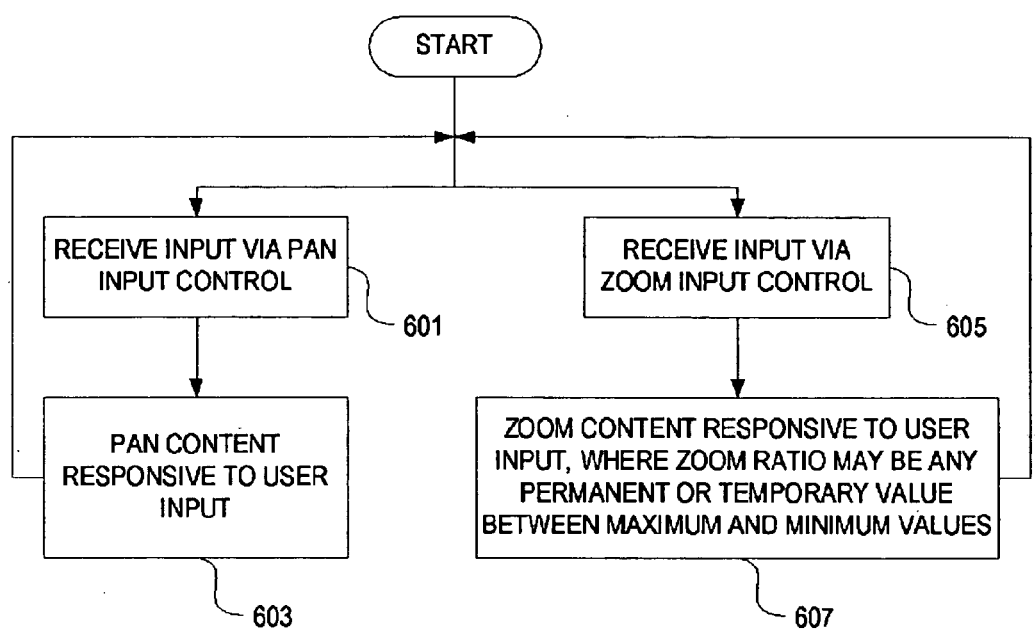
FIG. 6 illustrates a method according to one or more aspects of the invention.

Zoom input control 201 receives input from a user and sends the user input to the zoom circuit 511. Zoom circuit 511 modifies the zoom level of the display 103 (FIG. 6, step 607) responsive to the received input (FIG. 6, step 605) by sending zoom information to the display memory 517. Pan input control 203 receives input from a user (FIG. 6, step 601) and sends the user input to the pan circuit 513. Pan circuit 513 pans content on the display 103 (FIG. 6, step 603) responsive to the received input by sending pan information to the display memory 517.

Step control 517 receives input from a user and sends the user input to the stepping circuit 515. Stepping circuit 515 modifies the zoom or pan step increment responsive to the received input, and sends the modified step increment information to either the zoom circuit 511 or the pan circuit 513, as appropriate. The step control 517 may comprise two separate controls, one for zoom step level and one for pan step level. Alternatively, the step control 517 may be implemented in software via a preferences menu on the display screen, such that the user may manipulate the zoom step level and the pan step level without necessitating physical controls on the device 101 in addition to the zoom touch pad 201 and the pan touch pad 203.

Instructions to allow the device 101 to perform panning and zooming as described above may be stored as computer readable instructions on a computer readable device, such as ROM, RAM, hard disk, removable storage, or the like. Alternatively, the instructions may be embedded in hardware and/or firmware within the device 101. Panning and zooming may be performed according to known panning and zooming techniques in the art.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. A handheld device, comprising:
    a housing;
    a display screen on the front of the device;
    a first user input control on the back of the device, wherein the first user input control detects a direction of first user input; and
    a second user input control on the back of the device, wherein the second user input control detects a direction of second user input;
    wherein, when user input is received through the first user input control, content on the display screen is panned in a direction responsive to the detected direction of the first received user input, and
    wherein, when user input is received through the second user input control, content on the display screen is zoomed in or out responsive to the detected direction of the second received user input, the content on the display screen being zoomed in steps defined by a zoom-ratio, the zoom-ratio varying between a predetermined maximum zoom-ratio and a predetermined minimum zoom-ratio,
    wherein said zoom-ratio is defined by a content application.

2. The device of claim 1, wherein the controls comprise a touch pad.

3. The device of claim 1, wherein the controls comprise a trackball.

4. The device of claim 1, wherein at least one of the controls comprises a roller wheel.

5. The device of claim 1, wherein the controls comprise a joystick.

6. The device of claim 1, wherein the controls comprise a keypad button.

7. The device of claim 1, wherein the first and second controls are each located in a position that, when a user is holding the device with both hands on either side of the display screen, enables the user to manipulate one control with the user's right hand and one control with the user's left hand.

8. The device of claim 1 wherein each zoom-ratio is associated with one or more corresponding depths and wherein a first content corresponds to a first depth and a second content corresponds to a second depth.

9. The device of claim 8, wherein the device displays the first content when the first depth corresponds to a current zoom-ratio, and wherein the device displays the second content when the second depth corresponds to a new current zoom-ratio.

10. The device of claim 9 wherein the second content displays an object not present in the first content.

11. The device of claim 8 wherein said first content is displayed on the display screen only within a predetermined range of zoom-ratios.

12. The device of claim 8 wherein the display at different depths provides a simulated three-dimensional effect on the display screen.

13. A method for manipulating content displayed on a display screen of a handheld device, comprising the steps of:
   (i) when first user input is received through a first user input control capable of detecting a direction of user input, panning content on a display screen in a direction responsive to the detected direction of the first user input, and
   (ii) when second user input is received through a second user input control capable of detecting a direction of user input, content on the display screen is zoomed in or out responsive to the detected direction of the second user input, the content on the display screen being zoomed in steps defined by a zoom-ratio, the zoom ratio varying between a pre-determined maximum zoom-ratio and a predetermined minimum zoom-ratio,
   wherein first and second user input controls are located on the back of the device,
   and wherein the display screen is located on the front of the device, and
   wherein each input control comprises a touchpad.

14. The method of claim 13, wherein the first and second controls are each located in a position that, when a user is holding the device with both hands on either side of the display screen, enables the user to manipulate one control with the user's right hand and one control with the user's left hand.

15. A handheld device, comprising:
   a housing;
   a display screen on a front side of the housing;
   a first touch pad attached to a back side of the housing; and
   a second touch pad attached to the back side of the housing;
   wherein, when first user input is received through the first touch pad, content on the display screen is panned horizontally responsive to a horizontal component of the first received user input, and content on the display screen is panned vertically responsive to a vertical component of the first received user input,
   wherein, when second user input is received through the second touch pad, content on the display screen is zoomed responsive to at least one of a horizontal component and a vertical component of the received second user input, the content on the display screen being zoomed in steps defined by a zoom-ratio, the zoom-ratio varying between a predetermined maximum zoom-ratio and a predetermined minimum zoom-ratio.

16. The device according to claim 15, wherein horizontal panning is in a same direction as the received horizontal component of the first received user input, and wherein vertical panning is in a same direction as the received vertical component of the first received user input, thereby allowing the user to interact with the display as if the user is moving a displayed document with the user's finger.

17. A handheld device, comprising:
   a housing;
   a display screen on a front portion of the housing;
   a first touch pad attached to a back portion of the housing; and
   a second touch pad attached to the back portion of the housing;
   wherein, when first user input is received through the first touch pad, content on the display screen is panned horizontally responsive to a horizontal component of the first received user input, and content on the display screen is panned vertically responsive to a vertical component of the first received user input,
   wherein, when second user input is received through the second touch pad, content on the display screen is zoomed responsive to at least one of a horizontal component and a vertical component of the received second user input, the content on the display screen being zoomed in steps defined by a zoom-ratio, the zoom-ratio varying between a predetermined maximum zoom-ratio and a predetermined minimum zoom-ratio,
   wherein the first touchpad is located on the back of the device in such a position that, when a user is holding the device with both hands on either side of the display screen, thumbs to front and four fingers to back, the user can manipulate the first touchpad with one or more of the four fingers of a first hand of the user, and
   wherein the second touchpad is located on the back of the device in such a position that, when the user is holding the device with both hands on either side of the display screen, thumbs to front and four fingers to back, the user can manipulate the second touchpad with one or more of the four fingers of the second hand of the user.

18. A handheld device, comprising:
   a housing;
   a display screen on a first side of the device;
   a first user input touch pad located on an opposite side of the device directly behind the display screen, wherein the first user input touch pad detects a direction of first user input; and
   a second user input touch pad located on the opposite side of the device directly behind the display screen, wherein the second user input touch pad detects a direction of second user input;
   wherein, when user input is received through the first user input touch pad, content on the display screen is panned in a direction responsive to the detected direction of the first received user input, the content on the display screen being zoomed in steps defined by a zoom-ratio, the zoom-ratio varying between a predetermined maximum zoom-ratio and a predetermined minimum zoom-ratio, and wherein, when user input is received through the second user input touch pad, content on the display screen is zoomed in or out responsive to the detected direction of the second received user input.

19. The device of claim 18, wherein the first and second touch pads are each located in a position that, when a user is holding the device with both hands on either side of the display screen, enables the user to manipulate one touch pad with the user's right hand and one touch pad with the user's left hand.

20. A method for manipulating content displayed on a display screen of a handheld device, comprising the steps of:
(i) when first user input is received through a first user input touch pad capable of detecting a direction of user input, panning content on a display screen in a direction responsive to the detected direction of the first user input; and
(ii) when second user input is received through a second user input touch pad capable of detecting a direction of user input, content on the display screen is zoomed in or out responsive to the detected direction of the second user input, the content on the display screen being zoomed in steps defined by a zoom-ratio, the zoom-ratio varying between a predetermined maximum zoom-ratio and a predetermined minimum zoom-ratio,
wherein first and second user input pads are located on an opposite side of the device directly behind the display screen.

21. The method of claim 20, wherein the first and second touch pads are each located in a position that, when a user is holding the device with both hands on either side of the display screen, enables the user to manipulate one touch pad with the user's right hand and one touch pad with the user's left hand.

22. A handheld device, comprising:
a housing;
a display screen on a front side of the housing;
a first touch pad attached to a back side of the housing directly behind the display screen; and
a second touch pad attached to the back side of the housing directly behind the display screen;
wherein, when first user input is received through the first touch pad, content on the display screen is panned horizontally responsive to a horizontal component of the first received user input, and content on the display screen is panned vertically responsive to a vertical component of the first received user input,
wherein, when second user input is received through the second touch pad, content on the display screen is zoomed responsive to at least one of a horizontal component and a vertical component of the received second user input, the content on the display screen being zoomed in steps defined by a zoom-ratio, the zoom-ratio varying between a predetermined maximum zoom-ratio and a predetermined minimum zoom-ratio, and
wherein the first and second touch pads are each located in a position that, when a user is holding the device with both hands on either side of the display screen, enables the user to manipulate one touch pad with the user's right hand and one touch pad with the user's left hand.

23. A computer-readable medium comprising executable code for performing a method for manipulating content displayed on a display screen of a handheld device, comprising the steps of:
(i) when first user input is received through a first user input touch pad capable of detecting a direction of user input, panning content on a display screen in a direction responsive to the detected direction of the first user input, and
(ii) when second user input is received through a second user input touch pad capable of detecting a direction of user input, content on the display screen is zoomed in or out responsive to the detected direction of the second user input, the content on the display screen being zoomed in steps defined by a zoom-ratio, the zoom-ratio varying between a predetermined maximum zoom-ratio and a predetermined minimum zoom-ratio,
wherein first and second user input touch pads located on the back of the device,
and wherein the display screen is located on the front of the device.

* * * * *